Nov. 15, 1955 N. ANTON 2,724,041
SOLDERING GUNS AND TIPS THEREFOR
Filed April 29, 1952
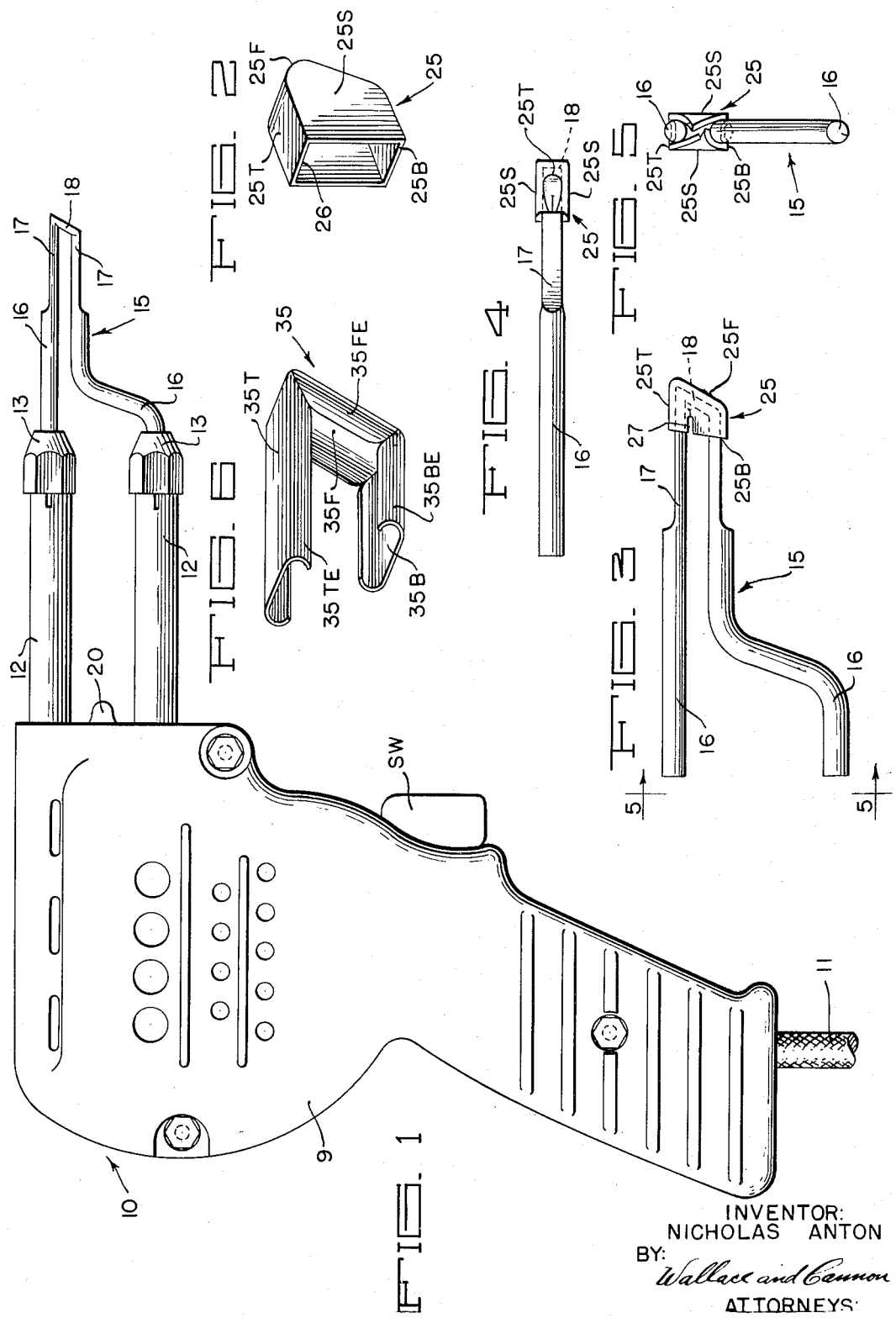
INVENTOR:
NICHOLAS ANTON
BY:
*Wallace and Cannon*
ATTORNEYS

United States Patent Office 2,724,041
Patented Nov. 15, 1955

2,724,041

SOLDERING GUNS AND TIPS THEREFOR

Nicholas Anton, Park Ridge, Ill.

Application April 29, 1952, Serial No. 284,989

1 Claim. (Cl. 219—26)

This invention relates to soldering tools and more particularly to that type in which the working part may comprise a metal that normally tends to be adversely affected by soldering operations.

It is recognized in the prior art that while copper as a working part for soldering tools has the advantage of being readily heated and of quickly attaining an efficient condition of "tinning," it possesses the disadvantage of tending toward oxidation at high temperatures and of forming alloys with the solder, thus impairing its utility. It has also been observed that the emission of gases accompanying soldering operations, as well as some of the fluxes and treatments used, tends to corrode such copper working part of the soldering tool.

Since it is desirable to retain the copper working part as such, attempts have been made in the past to protect the same by means of a metal, such as iron and nickel or the like, that is ordinarily resistant to one or more of the aforementioned effects thereby protecting and shielding the copper working part. Such prior attempts have generally taken the form of an electroplating technique, and in some instances by a machining operation. It will be recognized, however, that either operation is expensive, tedious, and necessarily exacting, thus introducing a factor of expense that renders the attempt prohibitive in many circumstances. It is therefore, the primary object of the present invention to protect the copper working part of a soldering tool against the aforementioned deleterious effects by a means in the form of an expendable sheath or cap which is cheap of manufacture and may be quickly and efficiently attached to the soldering tool in resistant and protective relation thereto in a simple manual operation.

In the past, where the copper working part has assumed a non-conventional form, such as a loop form in contrast to the conventional solid, pyramidal-shaped tip, additional problems of fitting a resistant and protective metal element thereto have been introduced. Thus, it will be appreciated that additional complications arise in any electroplating operation concerned with the plating of peculiar configurations, and in the case of a machined resistant and protective metal elements of the prior art the problems are particularly acute. It is, therefore, a further object of the present invention to afford a novel resistant and protective metal element for use with the copper working part of a soldering tool, which element has particular utility in connection with copper working parts of non-conventional shape; and an additional object is to afford a resistant and protective metal element of the above type which may be manually inserted over and about the end of the copper working part and clamped in place by an additional manual operation, all in a simple and quick manner.

Invariably where the soldering tool has been protected by one of the methods of the prior art, the resistant and protective metal member corresponding to the prior art wears before the copper working part, thus necessitating either a renewal thereof, continuance of use of the tool without protection of the copper work part, or else the purchase of an entirely new tool. A further important object of the present invention is to afford a cheap, expendable, and readily replaceable novel resistant and protective metal element that permits sustained use of the tool simply by removing and replacing the old or worn resistant and protective metal elements made and constructed in accordance with the principles of the present invention.

Other and yet important objects of the present invention will be apparent from the following description and claim and are shown in the drawings which illustrate the preferred examples and embodiments, as well as the principles of the present invention, and which I now consider to be the best mode of applying those principles. Other embodiments may be used, structural changes and modifications being made and used by those skilled in the art without departing from the present invention.

In the drawings:

Fig. 1 is an elevational view of a soldering tool;

Fig. 2 is a perspective view of a resistant and protective metal cap of the present invention;

Fig. 3 is a detail elevational view of the cap of Fig. 2 applied to the work part of the tool of Fig. 1;

Fig. 4 is a plan view of Fig. 3;

Fig. 5 is an end elevational view of Fig. 3; and

Fig. 6 is a perspective view of a modified form of the present invention.

The present invention may, for instance, be used in connection with the type of soldering tool indicated at 10 in Fig. 1 and described with particularity and detail in my co-pending application Serial No. 284,990, filed April 29, 1952, now Patent No. 2,680,187. For present purposes of disclosure, therefore, it will suffice to point out that the tool 10 is somewhat in the shape of a pistol, comprising a casing and handle section 9 of plastic material in which a transformer (not shown) is housed. A conductor cord 11 is adapted to supply the primary coil of the transformer, a trigger switch SW being afforded for this operation, and the secondary coil of the transformer is in the form of a relatively large, U-shaped, metal coil 12 that is looped about one end of the transformer. The member 12 may be of steel, for instance, or any other metal whose properties readily lend to use as a conductor of electricity. Secured to the free ends of the coil 12, by means as nuts 13, is a copper work part 15. The work part 15 is a one-piece copper member somewhat tapered in general configuration and electrically identical with the coil 12 so that it is readily heated as the result of electrical resistance when the circuit to the transformer, and therefore to the coil 12, is completed by closing the switch SW. This part 15 is described in detail in the aforesaid application, and for present purposes it need merely be mentioned that such comprises rearward leg elements 16, 16 forward extensions 17, 17 of a reduced cross-sectional area, and a tip or bight portion 18 that is flattened at the immediate front. It will be appreciated that when the tool 10 is put to use, the member 15, and more specifically the tip 18 thereof, constitutes the effective work part that conditions and works the solder during a soldering operation.

The part 15 generally tends to be adversely affected by conditions normally arising during any particular soldering operation and its useful life is thereby materially shortened, ordinarily requiring replacement. In Fig. 2, I have shown one form of the present invention as comprising a cap or sheath 25 that is adapted to freely but snugly fit on and over the tip 18 part way back along the extensions 17, 17. The cap 25 preferably consists of a soft ferrous alloy of a suitable type that may readily be drawn, or otherwise shaped, to assume a configuration corresponding substantially to that of the forward portion of the copper work part 15. Thus, the cap 25 comprises a top wall 25T and a bottom wall 25B, opposite side walls 25S, and a front wall 25F, Fig. 3, and may be of a thickness of between 0.005" and 0.010". It will be appreciated that only one end 26 of the cap 25 is open, and this end is adapted to fit snugly but freely over the forward portion of the copper work part 15. When thus assembled in protective relation on the tool 10, the top and bottom walls 25T and 25B engage the top and bottom sides, respectively, of the extension 17, 17; the opposite side walls 25S engage the outside lateral sides of the extension 17, 17; and the front wall 25F, inclined at an angle corresponding to the inclination from normal of the tip 18, firmly abuts against the front face of the latter.

While the inside dimensions of the cap 25 are such as to assure a normally firm grip, or tight parallel frictional engagement with, the associated facing parts of the copper work member 15 as above described, it is nevertheless desirable that assurance be had of retention in position of, as well as sure and efficient heat transfer from the tip 18 to, the cap 25, and this may be effected simply by crimping together or peening the side walls 25S after assemblage as best shown in Figs. 3 and 5. Localized breaks, as at 27, may occur at the rear or open end 26, but such have little, or in any event no practical, effect on the efficiency of subsequent soldering operations. In this manner, the work part of the soldering tool may be protected against corrosion and the like deleterious efforts during use by the novel metal cap element of the present invention that is normally resistant to such effects. In the event that the cap element 25 as applied itself becomes worn, the same may be readily removed and a replacement may be had just as readily.

In Fig. 6 I have shown a modified form in which the resistant and protective metal cap 35 is of a type that is formed or stamped out from a flat pattern. Thus it will be seen that there are numerous ways of configuring the resistant and protective metal cap embodied in the concepts of the present invention, and in the modified form there are walls that correspond to those previously considered, namely, and respectively, 35T and 35B, and 35F. However, instead of entirely closing in the opposite sides, such sides are partially enclosed by extensions as 35TE, 35BE, and 35FE of the top, bottom and front wall members respectively. The walls 35T, 35B, and 35F are preferably flat so that these may conform to the corresponding faces of the resistance element 15 at 17—17 and 18. On the other hand, since the sides of the forward extensions 17, 17 are rounded the extensions 35TE and 35BE of the cap 35 are shaped complementary thereof.

It will be seen from the foregoing that the present invention is primarily concerned with a resistant and protective metal cap for the tip portion of the working part of a soldering tool, which cap may be made from one piece and so shaped as to completely encase and enfold the aforesaid tip, being adapted for manual application, as well as removal, and easily crimped when in position of use so as to become a fixed part of the soldering tool, the distinguishing feature nevertheless being that there is no bond, thread, adhesion, integration, or other like metal identity or connection between the aforesaid tip and cap but rather, to thus define a phrase, the latter is "freely mounted" or "freely mounted parallel" on the former. Moreover, while I have described the present invention from the standpoint of one particular application, it will be appreciated that such constitutes but one illustrative embodiment, adaptation to similar and related uses, as for instance working parts of different shape and/or of a material other than copper, being made as desired or expedient. I intend, therefore, to be limited only by the scope of the appended claim which represents manifestations of practices of the present invention, distinguishing the same from others in the field.

I claim:

A soldering tool comprising, a generally U-shaped work part essentially of copper, said work part having a forward extension in the form of a loop, and a pair of rearwardly extending legs of a greater diameter than the forward extension, each adapted to be connected in series to corresponding ends of the secondary coil of a transformer whereby said work part may be electrically heated to an operative condition of use, the forward face of said forward extension of said work part being flattened and inclined to the horizontal to facilitate use thereof, and a protective and resistant ferrous metal cap arranged in sheath-like relation over the tip portion of said forward extension, said cap being configured complementary to said forward face to make a tight engaging fit therewith.

References Cited in the file of this patent

UNITED STATES PATENTS

| Number | Name | Date |
|---|---|---|
| 759,426 | Evershed | May 10, 1904 |
| 1,350,181 | Remane | Aug. 17, 1920 |
| 1,667,618 | Abbott | Apr. 24, 1928 |
| 2,274,408 | Hampton et al. | Feb. 24, 1942 |
| 2,359,393 | Sloan | Oct. 3, 1944 |
| 2,405,866 | Weller | Aug. 13, 1946 |
| 2,475,376 | Darling | July 5, 1949 |
| 2,501,192 | Scholler | Mar. 21, 1950 |
| 2,558,192 | Nockunas | June 26, 1951 |

FOREIGN PATENTS

| Number | Country | Date |
|---|---|---|
| 125,090 | Germany | Nov. 27, 1901 |
| 287,618 | Great Britain | Mar. 21, 1928 |